(12) United States Patent
Ludik

(10) Patent No.: US 10,617,988 B2
(45) Date of Patent: Apr. 14, 2020

(54) FILTER CLEANING

(71) Applicant: Tistech SPRL, Charleroi (BE)

(72) Inventor: Laszlo Ludik, Charleroi (BE)

(73) Assignee: Tistech SPRL, Charleroi (BE)

(*) Notice: Subject to any disclaimer, the term of this patent is extended or adjusted under 35 U.S.C. 154(b) by 0 days.

(21) Appl. No.: 16/078,805

(22) PCT Filed: Feb. 14, 2017

(86) PCT No.: PCT/EP2017/053201
§ 371 (c)(1),
(2) Date: Aug. 22, 2018

(87) PCT Pub. No.: WO2017/144301
PCT Pub. Date: Aug. 31, 2017

(65) Prior Publication Data
US 2019/0291036 A1    Sep. 26, 2019

(30) Foreign Application Priority Data

Feb. 24, 2016 (BE) .................................. 2016/5130

(51) Int. Cl.
*B01D 46/00* (2006.01)
*F01N 3/023* (2006.01)
*F02M 35/08* (2006.01)

(52) U.S. Cl.
CPC ..... *B01D 46/0075* (2013.01); *B01D 46/0068* (2013.01); *F01N 3/023* (2013.01);
(Continued)

(58) Field of Classification Search
CPC ................ B01D 46/00; B01D 46/0068; B01D 46/0075; B01D 46/0079; B01D 2279/30; F02M 35/086; F01N 3/023
(Continued)

(56) References Cited

U.S. PATENT DOCUMENTS 4,704,144 A * 11/1987 LeBlanc ............ B01D 46/0005
55/300
2007/0137150 A1    6/2007 Goddard
2009/0044375 A1    2/2009 Thomas et al.

FOREIGN PATENT DOCUMENTS

DE    102004029640 A1    1/2006
EP         1162351 A1    12/2001
(Continued)

OTHER PUBLICATIONS

European Patent Office Search Report and Written Opinion dated Apr. 4, 2017 in reference to International Application No. PCT/EP2017/053201 filed Feb. 14, 2017, 8 pages.
(Continued)

*Primary Examiner* — T. Bennett McKenzie
(74) *Attorney, Agent, or Firm* — Dinsmore & Shohl, LLP (57) ABSTRACT

The present invention generally relates to a process and apparatus for cleaning and removing particulate deposits in a particulate filter, in particular for the dry removal of ash deposits with a diesel particulate filter. Compared to the art known procedures, the method of the present invention is based on the provision of a two-stage process including a stage wherein the filter is exposed to a structural resonant frequency under pressure and a stage wherein the filter is exposed to a reverse flow. Combination of a structural resonance frequency with a reverse flow results in an efficient two-stage removal of the debris from the filter without causing any damage to the ceramic body of the filter.

12 Claims, 8 Drawing Sheets

(52) U.S. Cl.
CPC ......... *F01N 3/0233* (2013.01); *F01N 3/0237* (2013.01); *B01D 2279/30* (2013.01); *F02M 35/086* (2013.01)

(58) Field of Classification Search
USPC ...................................... 55/282–305; 95/279
See application file for complete search history.

(56) References Cited

FOREIGN PATENT DOCUMENTS

| | | | | |
|---|---|---|---|---|
| JP | 08177462 | A | 7/1996 | |
| JP | H08177462 | A * | 7/1996 | ............... F01N 3/02 |
| WO | 2011075598 | A2 | 6/2011 | |
| WO | 2011156477 | A2 | 12/2011 | |

OTHER PUBLICATIONS

Belgium Patent Office Search Report and Written Opinion dated Apr. 4, 2017 in reference to International Application No. PCT/EP2017/053201 filed Feb. 14, 2017, 10 pages.

European Patent Office International Preliminary Report on Patentability dated May 17, 2018 in reference to International Application No. PCT/EP2017/053201 filed Feb. 14, 2017, 24 pages.

* cited by examiner

FILTER CLEANING

FIELD OF THE INVENTION

The present invention generally relates to a process and apparatus for cleaning and removing particulate deposits in a particulate filter, in particular for the dry removal of ash deposits with a diesel or gasoline particulate filter. Compared to the art known procedures, the method of the present invention is based on the provision of a two-stage process including a stage wherein the filter is exposed to a structural resonant frequency under pressure and a stage wherein the filter is exposed to a reverse flow. Combination of a structural resonance frequency with a reverse flow results in an efficient two-stage removal of the debris from the filter without causing any damage to the ceramic body of the filter.

BACKGROUND TO THE INVENTION

In recent years, stricter legislations on exhaust emissions have emerged worldwide. Among these are restrictions on the amount of particulate matter (soot) that the vehicle may produce. A solution to this problem is the use of a Particulate Filter (PF) in the exhaust stream of a diesel or gasoline engine. A typical PF is a cylinder shaped ceramic (silicon carbide or cordierite) body: a honeycomb structure with lots of different parallel channels. Adjacent channels are closed off at each end by plugs to force the exhaust gas to penetrate through the walls. Soot from the exhaust will accumulate on these walls. From time to time this accumulated soot needs to be burned off, the so-called regeneration stage. During regeneration, the exhaust temperature is artificially elevated, for example by a secondary injection of diesel or retarded main injection. The regeneration is mainly managed automatically by the vehicle's ECU. In theory, this process unclogs the filter by burning off the soot into CO and $CO_2$. In practice, no burning process is perfect (especially on vehicles that only make short trips, due to the lower exhaust temperatures) and ash is formed and builds up in the filter as well (during regeneration, but also during normal operation). This ash is not removed by regeneration (as ash is already burned), and after some time the back-pressure over the PF, caused by the ash build-up, will become too high for the engine to overcome. At that point, the DPF needs to be replaced or cleaned. In Europe, the emission regulations have only recently become so strict that a PF has become necessary. In the US however, due to regulations for heavy transport (trucks . . . ), PF's are commonplace. The US market therefore has developed several means to clean out these filters, as replacement is a costly option.

Two main cleaning approaches are identified: the chemical or wet approach and the physical or dry approach. In the wet approach, a cleaning fluid (mostly water based) under pressure and sometimes warmed, is introduced into the filter and forced through the channels to clean out the ash and soot particles. The fluid is sometimes mixed with pressurised gas to form bubbles to improve cleaning. Ultrasonic waves are in some cases introduced into the liquid as well to improve cleaning. A critical step in this process however is the final drying of the filter internals with (warm) air. Any remaining moisture in the filter can create violent steam expansions, as the exhaust temperatures are in the hundreds of degrees centigrade: in these conditions, water will instantly turn to steam. These expansions are able to irreparably damage the filter, thus a major weak point for wet cleaning. A second remark is the fact that under the EURO 6 standard, particle filters are coated with a catalyst to increase the efficiency. This coating can be damaged by some cleaning liquids, so special fluids are needed. Lastly, the used fluid needs to be disposed of in an environmentally sound way, or filtered to be used again. Chemical cleaning is because of these reasons not desired.

The developed physical processes however only use the properties the filter was designed for in the first place: pressure and air flow. Accumulated particles are removed by a blast of pressurised air (air pulse cleaning). The dislodged particles are subsequently blown off by air flow. No foreign matter is therefore introduced in the filter. Other dry processes use moving air nozzles directed towards the filter openings to blow out any blockages, see e.g. WO 201175598. Lastly, sometimes mechanical vibrations are employed to dislodge particulate matter, e.g. patent DE 102004029640, and WO2011156477. The Japanese reference JP H08 177 462, uses the combination of vibrations and a stream of air, but such that a stream of pure air is applied as a counter current to a stream of dirty air leaving the filter, and wherein during the adjustment of this counter current of pure air a shock or vibration of the filter is generated. These vibrations are produced by an unbalanced motor, but are not claimed to be related to any resonance property. Only 'in- and decreasing frequency' is mentioned, order of magnitude of 100 Hz and 10 mm for 5-10 min. This process is however also linked to chemical cleaning. Patent EP 1162351 from PSA also applies mechanical vibrations, but in this patent the vibrations originate from the ICE itself, during operation. Instead of mechanical vibrations in these dry cleaning methods acoustic waves may equally be employed (see US2007/0137150), but as in the foregoing cases, the application of vibrations is always part of a process step in which a flow of gas running through the assembly.

The main problem with the dry approaches, is that they are designed with big truck PF's in mind. These truck PF's are essentially just large ceramic cylinders and are therefore easy to blow air onto: the entire top and bottom area of the filter are accessible. The problem with the particulate filters mounted on cars is that they are contained in the exhaust tubes. The filter ceramic body cannot easily be removed from the tube. The exhaust tube containing the filter usually has pipes connected to the entrance and exits. These entrances and exits are also narrower than the filter body. All these properties complicate the dry cleaning process, as the air pressure will not be able to evenly strike the filter body. Some solutions have been proposed based on existing truck PF cleaning, for example by successively introducing cones and rings into the filter tube, to selectively apply air pressure to part of the filter. These accessory tools however need to be constructed for every filter size, and for some more complex filter shapes the proposed tools will not be able to be introduced. Also, they are easily lost and can be forgotten to take out of the tube after cleaning, blocking the filter. Manual labour time will also increase. Other proposed solutions are lowering a nozzle into the tube and rotating this around the filter body surface, applying an airflow to each part of the filter. This however requires either a straight entrance to the filter or a complex mechanism and a measurement system to determine the distance to the filter body, to avoid damage. Introducing nozzles is therefore quite a complicated method, due to the different forms and sizes of car DPF's.

Taking into account the weak points of wet systems, the preferred embodiment of the solution to car DPF cleaning is a dry process. Looking at the existing 'solutions' to the aforementioned problems, it is clear that these are rather complex, in comparison to truck DPF cleaning, or inelegant and requiring different extra tools. Keeping the system simple for the operator is however desired, e.g. cost-effective wise.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

FIG. 1: Schematic representation of a pneumatic system (air flow means for generating a pressure or pressurized air flow into the particulate filter (FAP)) in a system of the present invention. Pressurized air is fed into the system by means of a compressor through entrance valve (1), wherein a first branch drives the vibration motors (10). In the exemplified embodiment this branch further includes a manometer (13) and valve (14) to determine and control the pressure in the vibration motors. Valve (15) allows opening the second branch of the pneumatic system feeding pressure and/or a pressurized airflow through the Particulate Filter (FAP). In the two step cleaning method of the present invention, in the first step wherein the FAP is imposed to structural resonance whilst under pressure in a first direction, valves (17) and (17') are closed and valves 16 and 16' are open with valves (18) and (19) at the exit being closed. In this configuration the pressurized air will pass via valve (16) towards one end of the FAP (left side in the schematic representation) and evacuate through valve (16') towards exit valves (18) and (19). In the second step valves (16) and (16') are closed and valves (17) and (17') as well as exit valve (19). In this configuration the pressurized air will pass via valve (17) towards the opposite end of the FAP (right side in the schematic representation) and evacuate through valve (17') towards exit valves (18) and (19). At the exit branch, valve (18) and manometer (20) are used to measure the clogging of the filter as the differential pressure with the entrance pressure at manometer (21). To clear the filter of soot, the exit valve (19) is open during this second stage of the cleaning process. In the first step this valve and valve (18) are both closed. As such, in this first step there is no airflow through the FAP, it simply put under pressure and being under pressure the filter is exposed to vibrations by the vibration motors. In the second step the vibrations are shut by closing vibration motor valve (14). Hence in the two stage process, during the first step there is no airflow through the filter and in the second step the filter is not exposed the mechanical agitation, i.e. is not exposed to shock(s) or vibration.

FIG. 2: Schematic representation of an alternative pneumatic system (air flow means for generating a pressure or pressurized air flow into the particulate filter (FAP)) in an apparatus of the present invention. Pressurized air is fed into the system by means of a compressor through entrance valve (1), wherein a first branch drives the vibration motors (10). In this alternative embodiment and different from the scheme in FIG. 1, this branch further includes a lubricator (23) to feed oil in the pressurized air driving the vibration motors. A further difference is at the entrance of the pressurized air now including an air treatment unit (22). In this air treatment unit a filter (for example of 5 μm) and a pressure regulator assure that clean air at a stable pressure is fed into the system. As in the foregoing scheme the second branch includes valve (15) and manometers (20) and (21) with an exit towards the particle receptacle (9). The configuration of the valves at either end of the particle filter (FAP) is different. Instead of a double parallel configuration, the pair of valves are now at a cross configuration with respect to the filter. With valves (25) and (25') closed, valves (24) and (24') are used in the first step, and in measuring the cleaning of the filter across manometer (20). With valves (24) and (24') closed, valves (25) and (25') are used in the second step to evacuate the loosened particles of the filter towards the receptacle (9). In this embodiment, valves (25), (25') and valve (24') are closed, and valve (24) is open during the first step of the cleaning method, and valves (24) and (24') are closed, and valves (25) and (25') are open during the second step of the cleaning method according to the invention. Hence again, with the characteristics of the instant application that there is no airflow through the filter during the first step, and there is no mechanical agitation of the filter during the second step.

FIG. 3: Open loop valve modulation sketch for a system of the present invention, comprising a compressor (100) charging a pressurised air tank (2). Fast acting valves (3), (12) at either end (e.g. at the exhaust side (102) and at the motor side (103)) of the FP and under control of a microcontroller (4) allows controlling the air pressure inside the FP. A flexible connector (5) and hood (6) assure a tight fit for first end of the PF (7), in the shown example at the exhaust side). Said PF being clamped in the apparatus by a lift able table (8) with an aperture accommodating the other (e.g. motor) side of the PF. A further flexible connector provides a conduit to an ash receptacle (9). A vibration motor (10), equally under control of the micro-controller (4), to expose the FP to a structural resonant frequency when under pressure.

DETAILED DESCRIPTION OF THE INVENTION

The currently envisioned solution to the above-described problem is to exploit the structural resonance of the filter body element in loosing of the soot particles. Every physical object has structural resonance frequencies (the amount depends on the object's degrees of freedom, so in a continuous object there are an infinite amount): frequencies on which an object will vibrate easily when excited, without much energy input.

So, this frequency can be used in a cleaning process: by exciting a resonant frequency (preferably the first one), the entire filter body will start to vibrate, dislodging the particles from the filter wall. This excitation can be done mechanically by applying a shaker or similar, or (more elegantly) by imposing sound waves of the desired frequency on the air flow in the filter tube, comparable to the widely known way of breaking a glass with sound (but in this case obviously with a lower energy, to avoid breaking the ceramic filter body). These sound waves can be created by a speaker (or more generally a vibrating membrane) or by modulating the opening of an air pressure valve (if the bandwidth is high enough for this application). Vibrating the body at frequencies other than resonance will probably also loosen some particles, but at the cost of a higher energy input for the same amplitude of vibrations and thus a lower efficiency.

In known methods, vibration of the filter body to loosen the particles is always done in combination with a flow of pressurized air blown through the filter. It has now been found that optimized results are achieved when the structural resonance frequencies are applied whilst the filter is maintained under pressure but in the absence of airflow, after exposure to vibration for a time sufficient to dislodge the particles from the filter, a flow of pressurized air is blown through the filter in the opposite direction of the pressure applied in the loosing step. These consecutive steps (loosing under pressure, and blowing in the opposite direction) may be repeated a number of times till a desired cleaning of the filter is achieved.

It is thus a first object of the present invention to provide a two-stage method for cleaning a particulate filter said method comprising;
  a first stage imposing the filter to a structural resonant frequency whilst under increased air pressure in a first sense, and
  a second stage imposing the filter an air flow in a sense opposite to the first sense; characterized in that there is no flow of air through the filter in the first stage.

In the first stage the filter is kept under an increased air pressure, but different from art known procedures there is no flow of air through the filter in this first stage. The filter is simply kept at an increased pressure during the first stage. In the exemplified embodiments the structural resonant frequencies are imposed to the filter by means of a vibration motor, in particular a pneumatic vibration motor. In one embodiment the vibration motor is aligned with the longitudinal axis of the filter body element. In another embodiment the vibration motor is aligned at right angles with the longitudinal axis of the filter body element. In a preferred embodiment there are at least two vibration motors, in particular pneumatic vibration motors, wherein at least one of said the vibration motors is aligned with the longitudinal axis of the filter body element, and wherein at least one of the vibration motors is aligned at right angles with the longitudinal axis of the filter body element. In the context of the instant application, the vibration motors must be capable of reaching high vibration frequencies (at least a couple of hundred Hertz) and have a sufficient centrifugal force (at least 1900 Newton). Any vibration motor complying with these characteristics is deployable in the method of the present invention. Preferably the vibration motor(s) used are pneumatic, since in the instant application an air compressor is needed to blow an air flow through the filter, and such an air compression installation is typically present in a garage. In one embodiment, the method of the present invention is further characterized in that the filter is not exposed to mechanical agitation during the second stage of the cleaning method. During the second stage the filter is not exposed to a structural resonant frequency.

In a particular embodiment the structural resonant frequency are at the first resonant frequency, or at harmonic frequencies at multiple values of the principal frequency of the filter. Principal frequencies of the filters start at 90 Hz up to about 110 Hz. Vibration frequencies of the vibration motor equally start at these values and up to about 1870 Hz. In a preferred embodiment the structural resonant frequency is at the first or second harmonic frequency of the principal resonant frequency. In a more preferred embodiment, the vibration frequency is within the range from 180 to 1870 Hz; even more preferable within a frequency range of 350 Hz to 1870 Hz; even more in particular at a frequency of about 1480 Hz.

The above-described 2-step method can be done in a single cycle, or in a plurality of consecutive cycles. As evident from the examples hereinafter, using the method of the instant application, even a singe cycle is sufficient to bring the filter into its original condition. In addition (infra), the method is equally efficient for a filter kept in horizontal position.

Different from the existing PF cleaning systems where the particulate filter is typically oriented with the unclean part (motor side) down (vertical orientation), so gravity can also help in the extraction of the dislodged particles, using the two step method of the present invention no such orientation is actually required. With valves in the system at either end of the particulate filter both the orientation of the air flow and the pressure inside the filter can be regulated rendering the vertical orientation to assist in clearing the filter optional. Furthermore, an airtight seal is needed around either end of the particulate filter to prevent the air from escaping to this low-resistance path. Thus in a further embodiment the system of the present invention further comprises the provision of an airtight seal around either end of the filter.

In another embodiment the method is characterized in that the pressurized air is blown through the particulate filter in the direction opposite to the direction of the air pressure in the first stage of the cleaning; in particular the pressurized air is blown through the particulate filter in the direction of the unclean part (motor side); in a particular embodiment the particulate filter is oriented with the unclean part downwardly.

Determining the resonant properties of the particulate filters needs to be done up front by testing the most important types. On-line measurement may still prove to be necessary, due to differences between the resonant properties of clean and clogged filters.

The practical implementation of the process can be based on the adaptation of an existing pulse cleaner. Changes will be needed to the air entry system, sealing and software of the existing machine. Also, some simple external "adapters" probably need to be constructed to accommodate for the number of different forms and sizes of the car PF's. The PF will be put in this adapter and the total assembly placed in the machine. Optimal implementation is evidently achieved in a system specifically designed to perform the method of the present invention. Such a system is for example disclosed in FIGS. 3 to 4, and in FIGS. 5 to 7, but in either instance the particulate filter is mounted on a support allowing the filter to be exposed to a structural resonance frequency by means of vibration generating means within the system and the filter being airtight connected at either end to a tubing system with air flow means for generating a pressure or pressurized air flow into said filter characterized in that the tubing system with air flow means comprises valves at either end of the particulate filter by means both the orientation and the pressure inside the filter can be regulated.

It is accordingly a further object of the present invention to provide a system for cleaning a particulate filter, said system comprising;

holding means to support a particulate filter;
air flow means for generating a pressure or pressurized air flow into said filter;
sealing means to provide an airtight seal at either end of the filter;
vibration generating means for imposing the filter to a structural resonant frequency; and
wherein said system is characterized in that it comprises valves at either end of the particulate filter by means both the orientation of the air flow and the pressure inside the filter can be regulated.

Figure 1:
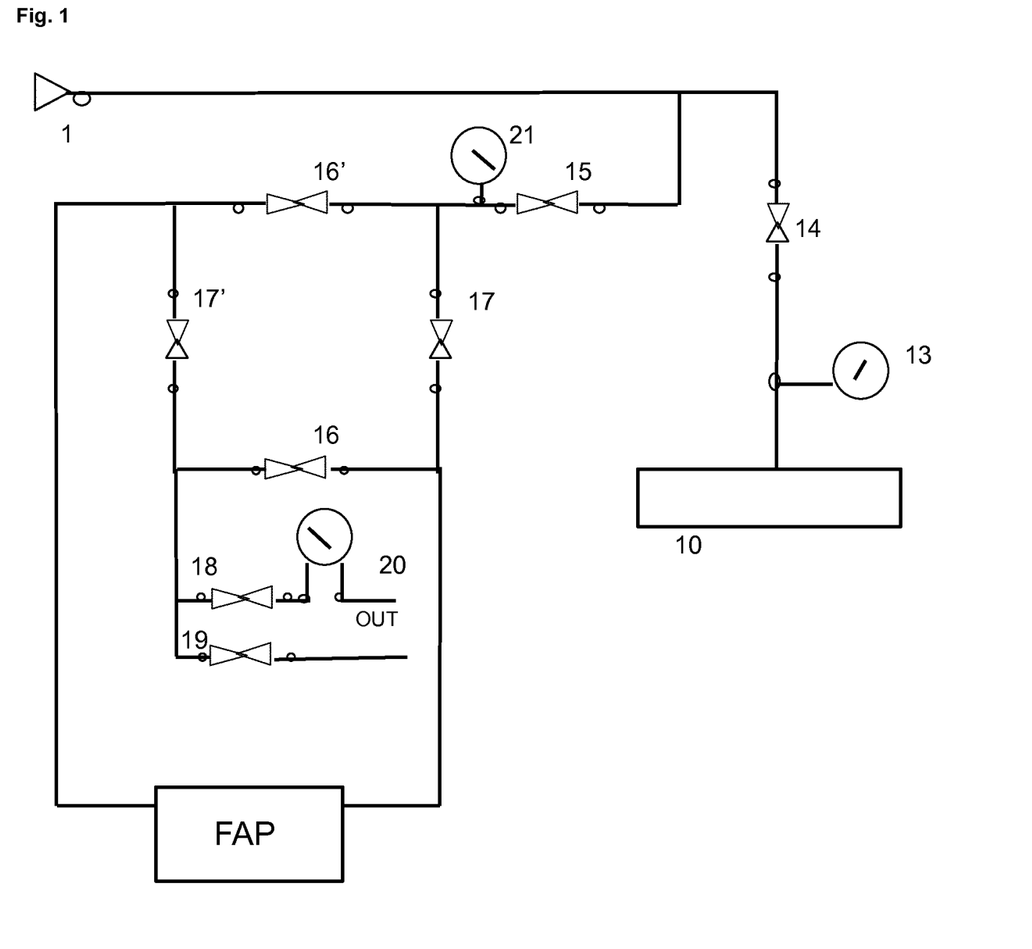

A schematic representation of a possible configuration of the valves at either end of the particulate filter is given in FIG. 1. Two sets of parallel operating valves, respectively valves (16) and (16') and valves (17) and (17') allow to control the direction of the pressurized air onto the particulate filter. Through valves (18) and (19) at the exit branch the pressure on the filter can be controlled. In the first step of the cleaning process, i.e. wherein the FAP is imposed to structural resonance whilst under pressure in a first direction, valves (17) and (17') are closed and valves (16) and (16') are open with valves (18) and (19) at the exit being closed. In this configuration the pressurized air will pass via valve (16) towards one end of the FAP (left side in the schematic representation) and evacuate through valve (16') towards closed exit valves (18) and (19) with pressure build up over the filter. In the second step valves (16) and (16') are closed and valves (17) and (17') as well as exit valve (19). In this configuration the pressurized air will pass via valve (17) towards the opposite end of the FAP (right side in the schematic representation) and evacuate through valve (17') towards exit valves (18) and (19). At the exit branch, valve (18) and manometer (20) are used to measure the clogging of the filter as the differential pressure with the entrance pressure at manometer (21). To clear the filter of soot, the exit valve (19) is open during this second stage of the cleaning process. In the first step this valve and valve (18) are both closed. As such, in this first step there is no airflow through the FAP, it simply put under pressure and being under pressure the filter is exposed to vibrations by the vibration motors. In the second step the vibrations are shut by closing vibration motor valve (14).

Figure 2:
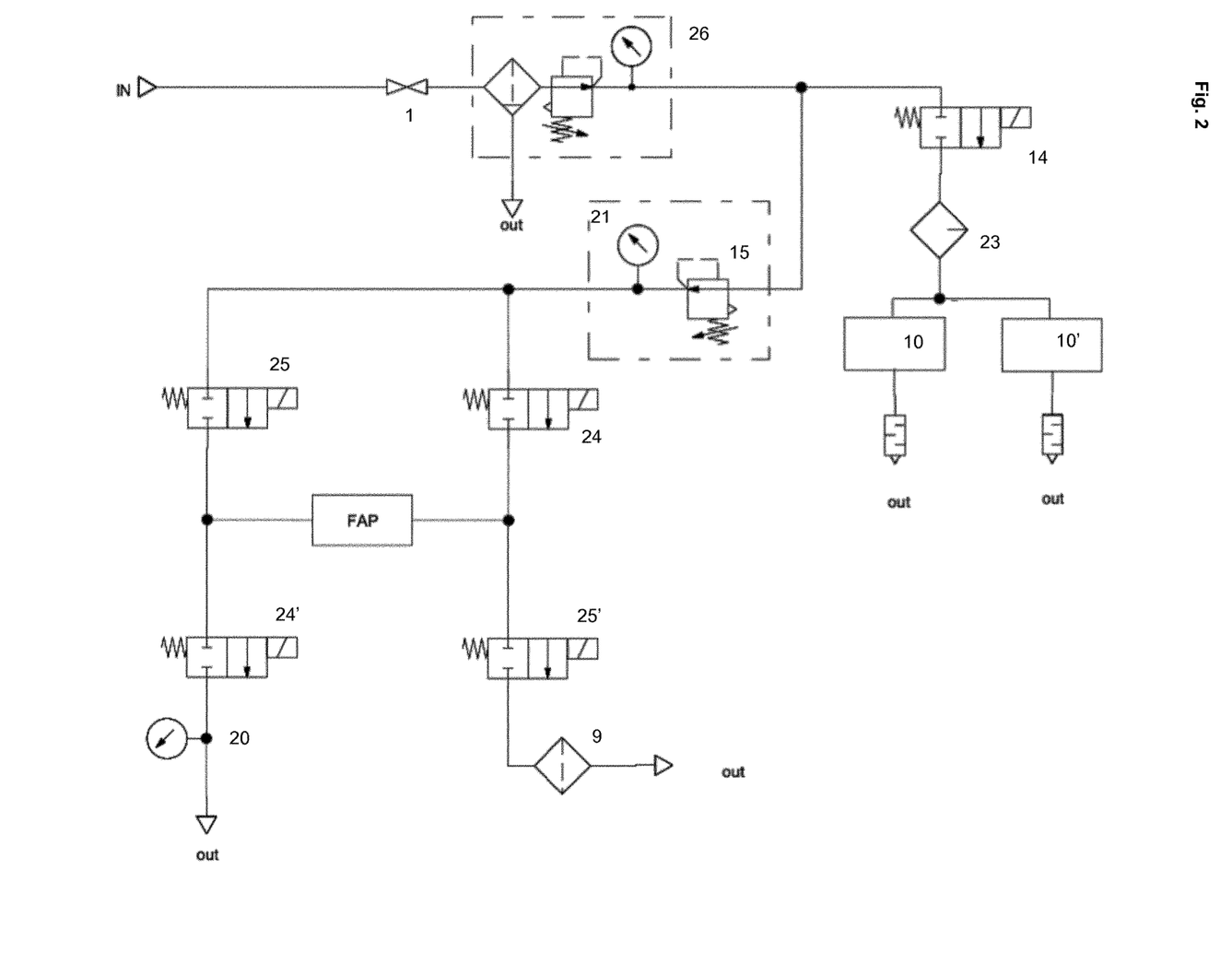
Figure 5:
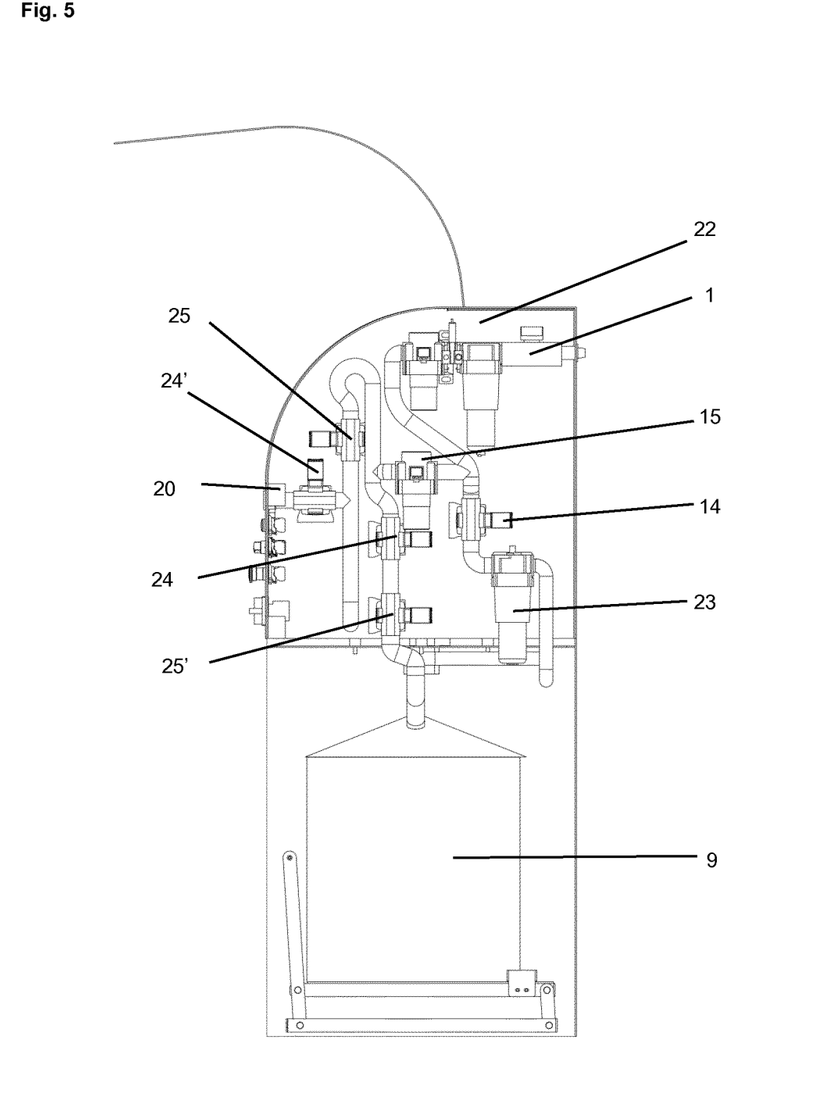
FIG. 5: Cross sectional side view of a system of the present invention, showing the entrance valve (1) and the two pair of valves (24 and 24') and (25 and 25') used to control the orientation of the pressure air on the filter. It further shows an air treatment unit (22) to filter the incoming air and assure a steady input pressure (this is typically set at 4.5 bar for the system) for the system. In the branch feeding the vibration motors, this embodiment further shows the presence of a lubricator (23) injecting oil within the air of this part of the pneumatic system. The presence of such a lubricator extends the life of the vibration motors.
Figure 6:
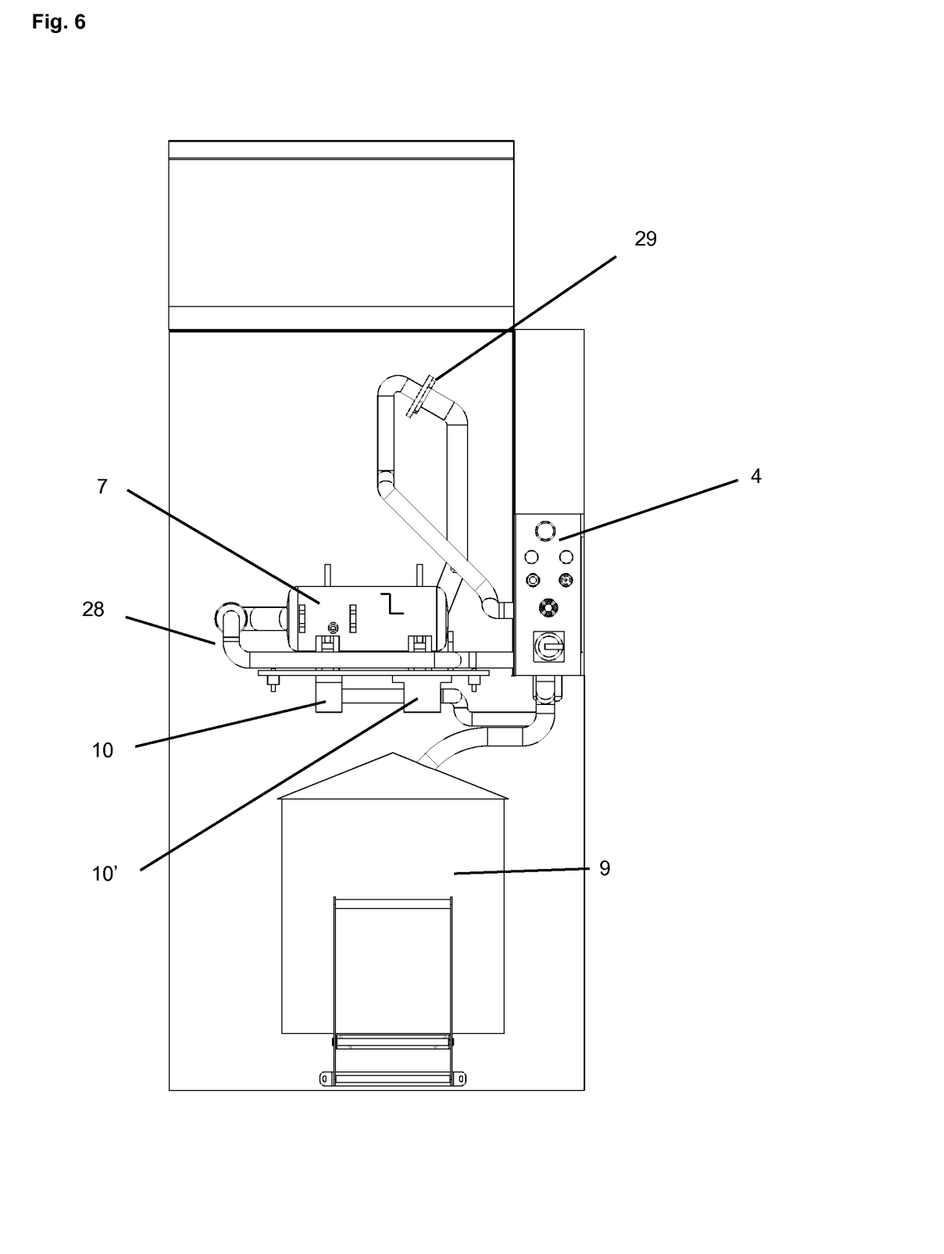
FIG. 6: Cross sectional front view of a system of the present invention.
Figure 7:
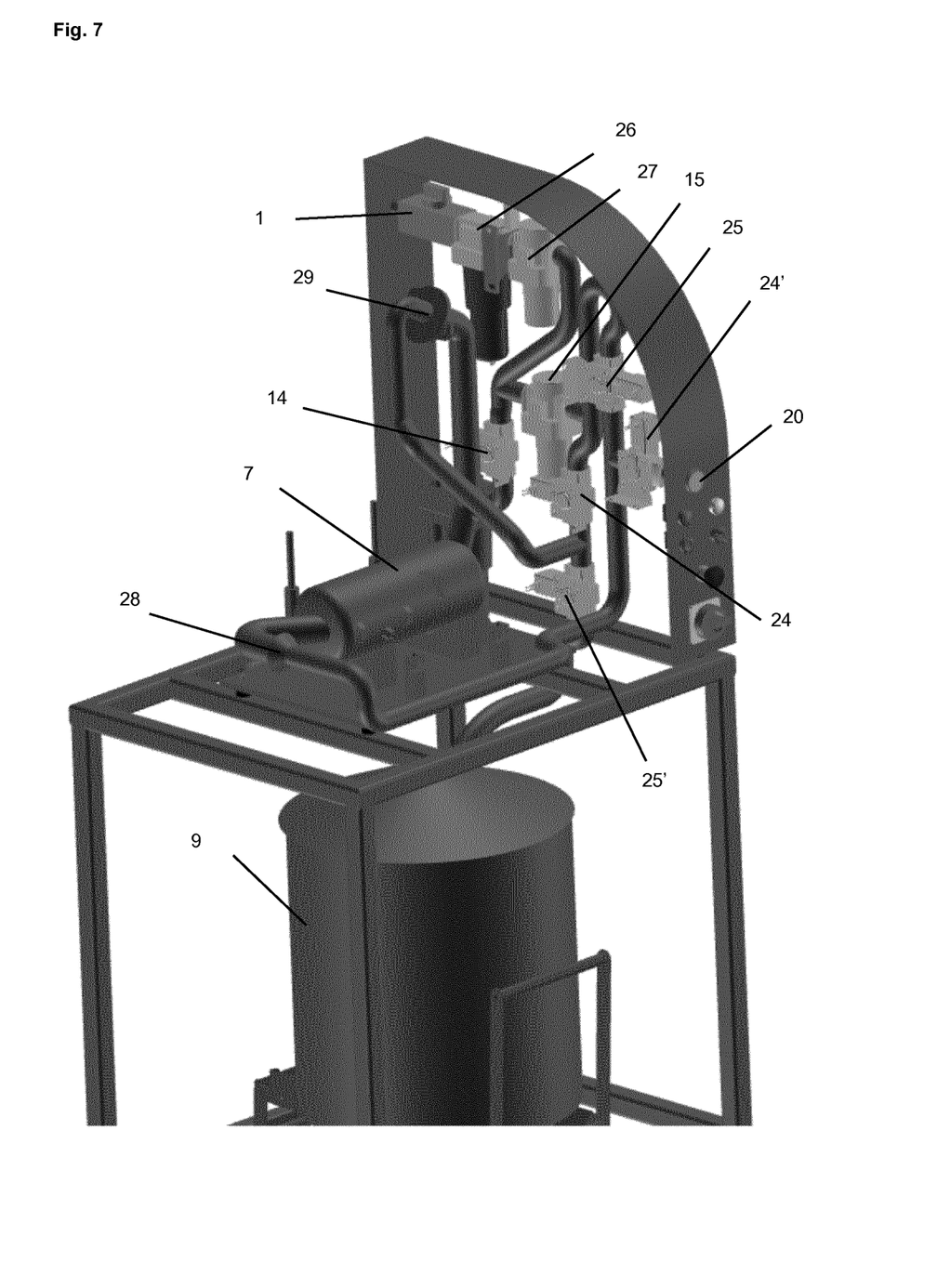
FIG. 7: Perspective front view of the system shown in FIGS. 5 and 6.
Figure 8:
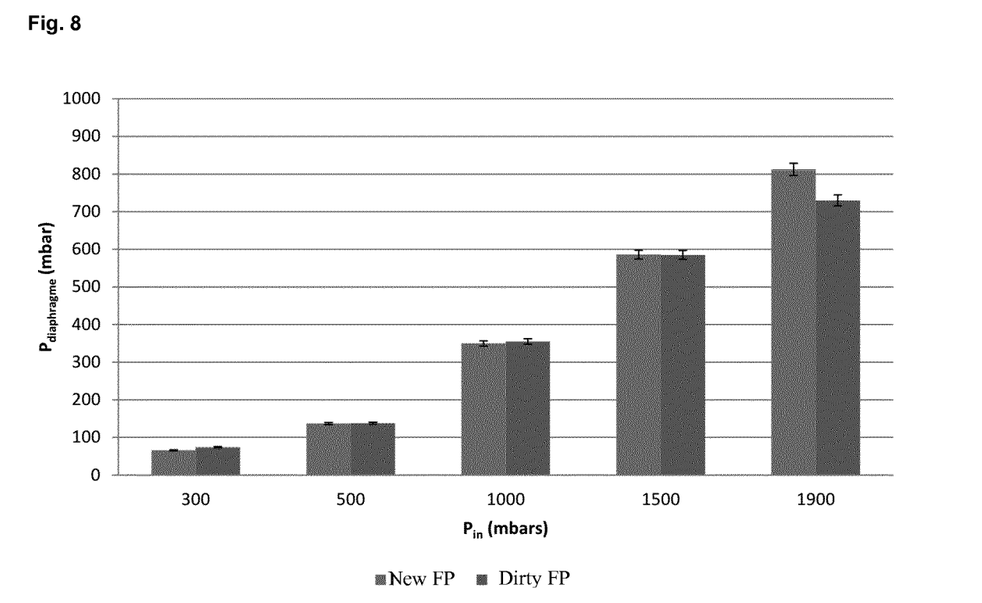
FIG. 8: comparison of the diaphragm pressure (normal direction of air flow) between the new FP and Dirty FP
Figure 9:
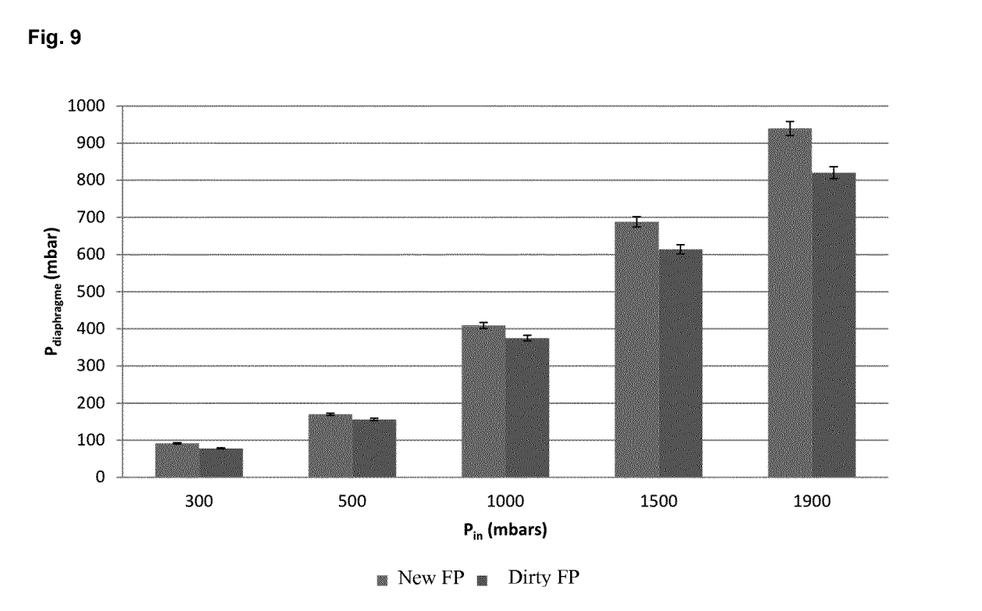
FIG. 9: comparison of the diaphragm pressure (inverse direction of air flow) between the new FP and Dirty FP

An alternative representation of the valves at either end of the FAP and as employed in the exemplified embodiment of FIGS. 5 to 7, is given in FIG. 2. In this embodiment the branch feeding the vibration motors is actually the same and includes a valve (14) to control the pressure in the vibration motors (10). In this embodiment the branch feeding the vibration motors further comprises a lubricator (23) injecting oil in the air of this part of the pneumatic system. As in the foregoing system, another valve (15) allows opening of the second branch of the pneumatic system feeding pressure and/or a pressurized airflow through the Particulate Filter (PF) in the drawing also referred to as FAP. A pair of valves at either end allows to control the direction, pressure and flow of the pressurized air on the PF. In the first step of the two stage cleaning process valves (25) and (25') are closed, valve (24) is open and valve (24') is closed. As such the pressurized air will pass through valve (24) towards one end of the FAP (right side in the schematic representation) with pressure build up since valve (24') is closed. In the second stage, valves (24) and (24') are closed and valves (25) and (25') are opened. In this configuration the pressurized air will pass through valve (25) towards the other end of the FAP (left side in the schematic representation) flow trough the filter and evacuate via valve (25') and into the receptacle (9). Again during the first step there is no flow of pressurized air trough the filter and during said first stage the vibration motors are operated and put under pressure by opening of valve (14), to dislodge the particles from the filter. In the second stage the vibration motors are shut by closing valve (14).

The holding means to support the particulate filter may include any device or structure capable of supporting the particulate filter in a pressurized condition whilst being exposed to structural resonant frequency vibrations, without hindering the latter and the provision of the aforementioned frequencies thereto. The holding means may for example include an annular ring or other structure for frictionally engaging the particulate filter. Alternatively, the holding means could simply comprise a surface with an aperture for supporting the particulate filter on a top portion thereof. Such surface may optionally comprise further structure like engagement means, notches, rims and edges for facilitating a relatively fixed position of the particulate filter with respect to the aperture. In another alternative embodiment, the holding means to support the particulate filter could comprise structural elements engaging the particulate filter in a gripping engagement. From these examples, it will be evident to the skilled artisan that any alternative structure for facilitating a relatively fixed position of the filter with respect to the pressurized air, is within the admit of the present invention. In the embodiment shown in FIGS. 5 to 7 the filter is lying on a horizontal support (table or frame) with for example straps binding the filter to the support.

Figure 3:
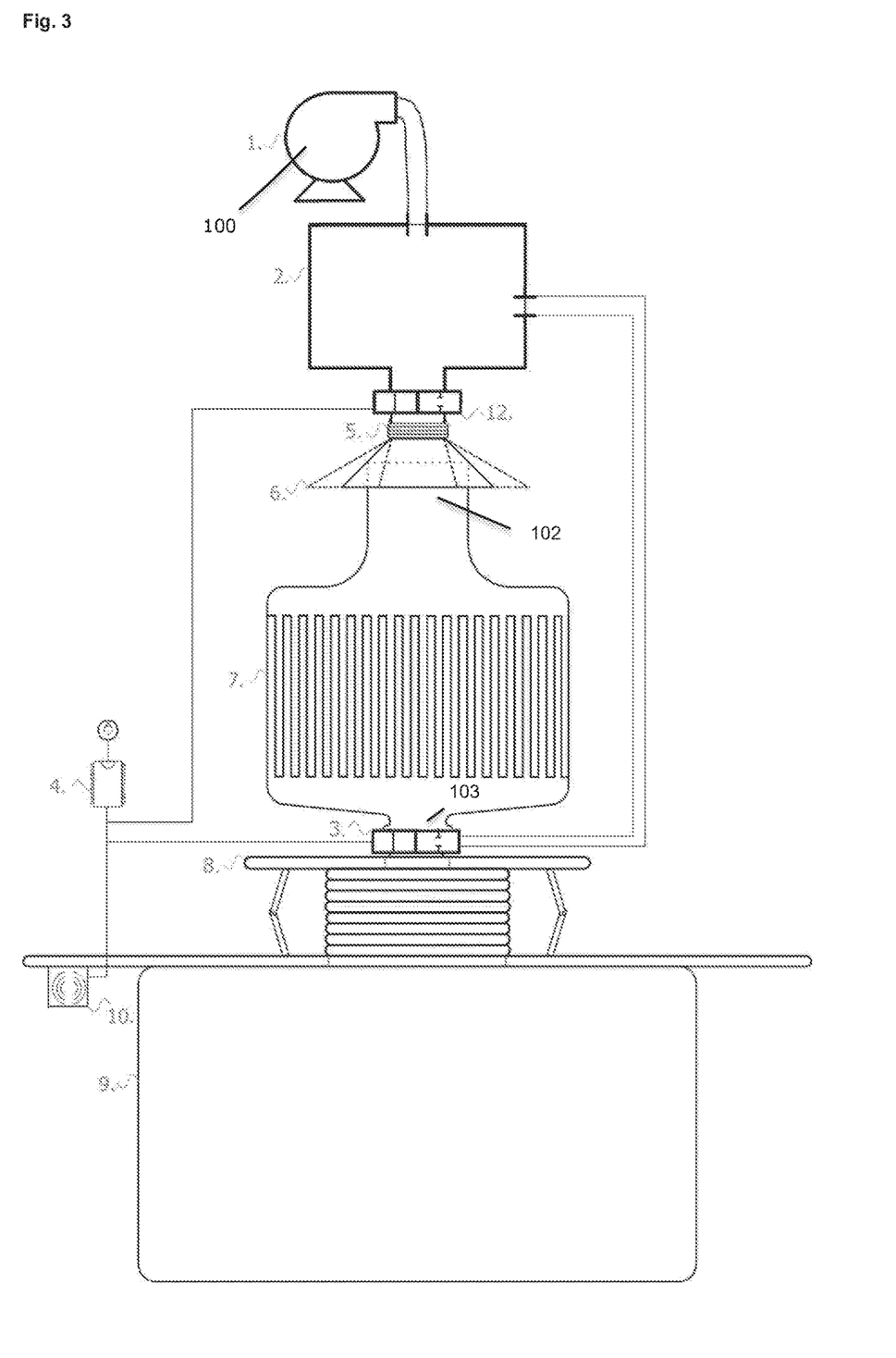
Figure 4:
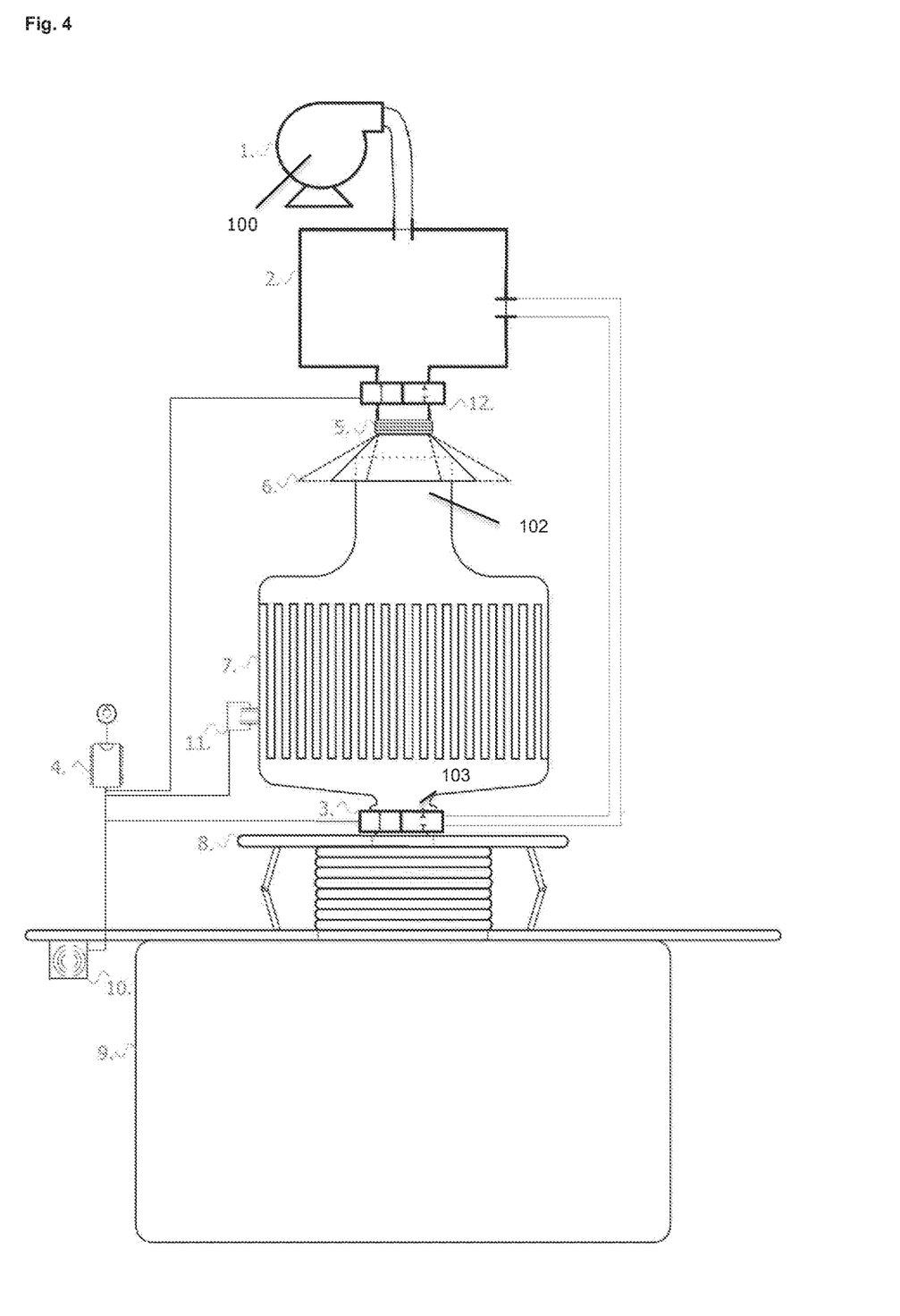
FIG. 4: Open loop valve modulation sketch for a system of the present invention, similar to the system shown in FIG. 1, but further comprising an accelerometer (11) to measure the vibration of the filter. The accelerometer will provide input to the controller (4) to adjust the frequency of the vibration motor (10).

In either of said configurations, and to prevent air from escaping, in a preferred embodiment the holding means will further comprise sealing means to provide an airtight seal at either end of the filter. In the embodiment exemplified in the accompanying drawings 3 and 4, the systems actually includes holding means (the hood (6) and the table with lift mechanism (8)) to clamp the DPF in place, wherein said holding means comprise sealing means to proved an airtight pathway through the DPF. In the exemplified embodiment at the top (exhaust side of the DPF) of the DPF a hood connected to a flexible rubber sleeve is placed. The flexible sleeve allows the hood to swivel with a small angle to accommodate tight closure at the airflow entrance for slightly angled exhaust ports. The bottom (motor) side of the DPF is placed on a table with an opening, said opening being air tight closed with a rubber ring. The size of the ring can be adapted to the opening size of the DPF.

In an alternative embodiment, such as for example used in FIGS. 5 to 7 wherein the filter is lying on a horizontal support (table or frame), the sealing means (28, 29) are part of the pneumatic system. To accommodate different sizes and shapes of the car PF's, said sealing means could be adjustable, such as for example a rubber collar for pipe-in-pipe connection, or a sleeve connection. Alternatively, a set of adaptors will be available to adjust the opening(s) of the car PF's to fit with the air entry (and air exit) system(s) of the cleaning system (apparatus) of the present invention. In the exemplified embodiment such an adapter could for example consist of a collar or a sleeve adapter constructed to provide a slide able fit for a given PF exhaust size. Airtight closure at either end of the PF's could again be realized using art known means such as a rubber collar for pipe-in-pipe connection (see FIGS. 6 and 7).

As follows from the foregoing, the present invention is based on imposing in a first stage structural resonance frequencies on the particulate filter whilst kept under pressure in a first direction, followed by a second stage wherein the filter is exposed to an air flow in the opposite direction. Said method and device accordingly requires the presence of vibration generating means for imposing a structural resonant frequency of the filter, and means to control the orientation of the pressure on the filter. For the practical implementation, the system comprises at either end of the filter a valve within the pressurized airflow path and a vibration motor connected to the holding means, wherein said valves and motor are connected to a controller with a software signal generator, configured to control the opening and closure of the valves within the pressurized airflow path and to control the output frequency of the vibration motor on the filter. In a particular embodiment and as already mentioned herein before, in one embodiment the vibration motor is aligned with the longitudinal axis of the filter body element. In another embodiment the vibration motor is aligned at right angles with the longitudinal axis of the filter body element. In a preferred embodiment there are at least two vibration motors on the holding means, in particular pneumatic vibration motors, wherein at least one of said vibration motors is aligned with the longitudinal axis of the filter body element, and wherein at least one of the vibration motors is aligned at right angles with the longitudinal axis of the filter body element. In the context of the instant application, the vibration motors must be capable of reaching high vibration frequencies (at least a couple of hundred Hertz) and have a sufficient centrifugal force (at least 1900 Newton). Any vibration motor complying with these characteristics is deployable in the method of the present invention. Preferably the vibration motor(s) used are pneumatic.

The valves both being within the pressurized airflow, allow controlling the direction of the air pressure on the filter, wherein in the first stage one of the valves will be closed resulting in a pressure build up in the filter in one direction but without an actual airflow going through the filter. In this first stage and whilst being under pressure the filter is exposed to a vibration at a structural resonant frequency of the filter for a time sufficient to dislodge the particles from the filter, as used herein the structural resonant frequency are at the first resonant frequency, or at harmonic frequencies at multiple values of the principal frequency of the filter. Principal frequencies of the filters start at 90 Hz up to about 110 Hz. Vibration frequencies of the vibration motor equally start at these values and up to about 1870 Hz. In a preferred embodiment the structural resonant frequency is at the first or second harmonic frequency of the principal resonant frequency. In a more preferred embodiment, the vibration frequency is within the range from 180 to 1870 Hz; even more preferable within a frequency range of 350 Hz to 1870 Hz; even more in particular at a frequency of about 1480 Hz. Per reference to the examples hereinafter, in this first stage the principal frequencies of the filters start at 90 Hz up to about 110 Hz, and consequently vibration frequencies of the vibration motor equally start at about 90 Hz and up to about 1870 Hz; even more preferable at a frequency range of 350 Hz to 1870 Hz; even more in particular at a frequency of about 1480 Hz. Pressure inside the filter is increased at pressures above 1 bar, and up to about 6 bar, more in particular up to about 4.5 bar. Under these conditions of increased pressure and exposure to a structural resonant frequency, particles are efficiently dislodged from the filter rendering a short first stage step in the method of the invention. Times as short as a couple of minutes are under these conditions indeed sufficient, for example up to 10 minutes, in particular up to 5 minutes are under these conditions sufficient to dislodge the particles from the filter. In a particular embodiment, in the first stage the vibration motor is for example operated at a frequency selected from about 350 Hz; from about 1480 Hz for about 5 minutes whilst the filter is kept at a pressure of 4.5 bar without an airflow through the filter. In a preferred embodiment the pressure is increased in the direction of the clean part (exhaust side) of the filter. In the second stage both valves are opened and airflow is generated through the filter in the opposite direction of the pressure in the first stage. The sudden drop in pressure enhances the airflow through the filter with a swift, almost instant, and complete removal of the loosened particles from the filter. The pressurized air flow in this second stage is at values up to about 2 bar, in particular at about 1.5 bar for up to about 5 minutes, in particular up to about 2 minutes. Per reference to the examples hereinafter, in one embodiment the method of the instant invention is further characterized in that the filter is only exposed to resonant structural energy (vibrations) during the first stage of the cleaning method. The filter is not exposed to shock(s) or vibration(s) during the second stage of the cleaning method. Expressed differently, after the filter has been put under pressure and is being exposed to a structural resonant frequency, the latter is stopped during the second stage wherein the dislodged particles are removed by means of an air flow through the filter, in a direction opposite to the pressure applied in the first stage. Surprisingly, the sudden drop in pressure is in itself sufficient for the dislodged particles to be included in the airflow through the filter, to an extend that the filter is 'quasi' completely regenerated to its original state in a single run.

In the system of the present invention the controller for the valves and the vibration generating means can be operated in an open loop or a closed loop scheme. In the open loop system of FIG. 3, the desired frequency values are simply set in the controller depending on the filter to be cleaned. Setting of the desired frequencies may be done by the user through a user interface, but could also follow from the adaptors used in mounting a given DPF in the system. In said instance the adaptors has dimension-depending recognition points that, in interaction with the rest of the cleaning apparatus, allow the controller to recognise the dimensions of the DPF present, and set up the desired frequency values for said DPF. In its simplest form, this dimension-depending recognition points could consist of contact elements present on the adaptor and dependable on the dimensions of DPF will be unique in their interaction with the contact elements present on the rest of the cleaning apparatus. Thus in a further embodiment of the present invention, the system further comprises DPF dimension-dependent recognition points. In a closed loop scheme initial frequency values for a given DPF are set in a similar way, but in said instance the system further comprises a feedback loop continuously adjusting the frequency settings of the controller based on measurements of the structural frequencies of the filter whilst being cleaned. In said embodiment the structural frequencies of the filter are measured by determining the vibration level of the filter, such as for example using an accelerometer (11) mounted to the outside of the DPF. The number and position of the accelerometer(s) is by no way limited and an exemplary configuration is presented in FIG. 4. The values from the accelerometer(s) are then fed back to the micro-controller. With this feedback, the optimal frequency can be found: varying the frequency over a frequency band around the expected resonance and determining maximum excitation. This found (structural) frequency will than become the new (structural) driving frequency. This method may have better results than open loop, as the resonant properties can fluctuate a bit, due to the level of ash build-up and the like. Also, the feedback signal can be used to monitor the level of vibration to prevent damage or for diagnostic purposes. It is accordingly an object of the present invention to provide a method for cleaning a particulate filter, said method including the measurement of the vibration level of the filter. Consequently, in a further aspect the present invention provides a system for cleaning a particulate filter, said system comprising means to measure the vibration level of the filter.

Per reference to the exemplified embodiments, the cleaning system of the present invention may further comprise collection means, such as an ash receptacle (9) for the particles being released from the particulate filter whilst being processed.

The invention herein has been described and illustrated with reference to the embodiments of FIGS. 1 to 7, but it should be understood that the features of the invention are susceptible to modification, alteration, change, or substitution without departing significantly from the spirit of the invention. For example the sizes and shapes of the various elements like the pressurized air tank, the flexible connector, the hood, the table, etc. may be altered to fit specific applications. Accordingly, the specific embodiments illustrated and described herein are for illustrative purposes only and the invention is not limited thereto except by the following claims and their equivalents.

EXAMPLES

Measurement of Clogging of the Filter

First, the pressure loss through a new diesel particle filter was measured, and determined as the differential or rest pressure ($P_{diaphragme}$) at the exit of the pressurized airflow. The measurement was carried out at different supply pressures ($P_{in}$). Furthermore, we have systematically taken the pressures in both directions of airflow. The direction called "Sens normal" is the conventional direction of flow of exhaust gas.

The following values (Table 1) were found:

|              | $P_{diaphragme}$ (mbar) |             |
|--------------|-------------|-------------|
| $P_{in}$ (mbar) | Sens normal | Sens inverse |
| 0            | 0           | 0           |
| 300          | 66          | 92          |
| 500          | 137         | 170         |
| 1000         | 350         | 409         |
| 1500         | 586         | 688         |
| 2000         | 867         | 990         |

It is notable that the differential pressure in the inverse direction "Sens inverse" is much higher. This may be due to the geometry of the filter and/or of the supply circuit.

We then repeated this measurement on a dirty filter. It was not possible to increase the supply pressure up to 2 bar, so we stopped to 1900 mbar.

The following values (Table 2) were found:

|              | $P_{diaphragme}$ (mbar) |             |
|--------------|-------------|-------------|
| $P_{in}$ (mbar) | Sens normal | Sens inverse |
| 0            | 0           | 0           |
| 300          | 74          | 78          |
| 500          | 138         | 156         |
| 1000         | 355         | 375         |
| 1500         | 585         | 614         |
| 1900         | 730         | 820         |

In the graphical representation of FIGS. 6 (sens normal) and 7 (sens inverse), we interpolated value to 1900 mbar for the new filter. In these graphs, we can see that the gap between the new filter and the dirty filter begins to mark 1500 mbar inlet pressure (in reverse) and is significant in both directions from 1900 mbar.

Cleaning of the Filter

To clean the filter, two actions are necessary:
Vibrate; and -Blow

The vibration dislodges the particles of the filter and blowing evacuates. It was not necessary to blow air during the phase of vibration.

The following treatment was applied:
1) 5-minute vibration at an air supply pressure of 4.5 bars (frequency of vibration motors=350 Hz);
2) 2 minutes blower, air supply pressure between 500 mbar and 1 bar DPF.

After cleaning the differential pressure of the filter was measured at a supply pressure of 1900 mbars in both senses. As evident from the below table (Table 3) the cleaning method according to the invention and simply based on a two stage protocol wherein in a first phase the filter is vibrated whilst under pressure but without blowing air during the phase of vibration, followed by an evacuation phase wherein the dislodged particles are blown out of the filter, is indeed sufficient to return the filter to its 'new' state. Eventually the cleaning method can be repeated in a number of cycles.

TABLE 3

|              | $P_{in}$ (mbars) |             |
|--------------|-------------|-------------|
|              | Sens normal | Sens inverse |
| FAP neuf     | 813         | 939         |
| FAP sale     | 730         | 820         |
| FAP nettoyé  | 815         | 915         |

Feature List

| 1  | entrance valve |
| 2  | pressurised air tank |
| 3  | fast acting valve at motor side |
| 4  | microcontroller |
| 5  | flexible connector |
| 6  | hood |
| 7  | particle filter |
| 8  | lift table |
| 9  | ash receptacle |
| 10 | vibration motor |
| 11 | accelerometer |
| 12 | fast acting valve at exhaust side |
| 13 | manometer vibration motor branch |
| 14 | valve vibration motor branch |

| | |
|---|---|
| 15 | opening valve PF branch |
| 16, 16 | pair of valves to control the orientation and pressure over the filter |
| 17, 17' | pair of valves to control the orientation and pressure over the filter |
| 18 | measuring exit valve |
| 19 | evacuation exit valve |
| 20 | manometer after filter |
| 21 | manometer before filter |
| 22 | air treatment unit |
| 23 | lubricator |
| 24, 24' | pair of valves to control the orientation and pressure over the filter |
| 25, 25' | of valves to control the orientation and pressure over the filter |
| 26 | air treatment filter |
| 27 | air treatment pressure regulator |
| 28 | sealing means at one end of the PF |
| 29 | sealing means at the other end of the PF |
| 100 | compressor |
| 102 | exhaust side |
| 103 | motor side |

The invention claimed is:

1. A two-stage method for cleaning a particulate filter, the method comprising;
  a first stage comprising imposing the particulate filter to a structural resonant frequency while the particulate filter is under increased air pressure, wherein the air pressure is increased in the direction of a clean part of the particulate filter; and
  a second stage comprising imposing the particulate filter to an air flow in the direction of an unclean part of the particulate filter,
  wherein during the first stage there is no flow of air through the particulate filter, and wherein during the first stage the air pressure in the particulate filter is increased to a pressure of between 4.5 bar to 6.0 bar.

2. The method according to claim 1, wherein the structural resonant frequencies are imposed to the particulate filter by a vibration motor.

3. The method according to claim 2, wherein there are at least two vibration motors, wherein at least one of the vibration motors is aligned with the longitudinal axis of the particulate filter body, and wherein at least one of the vibration motors is aligned at right angles with the longitudinal axis of the particulate filter body.

4. The method according to claim 3, wherein the vibration motors are vibrating at a vibration frequency in the range from 90 to 1870 Hz.

5. The method according to claim 1, wherein during the second stage the air flow is a pressurized air flow at values up to 2 bar.

6. The method according to claim 1, wherein the particulate filter is a Diesel Particulate Filter (DPF) or Gasoline Particulate Filter (GFP).

7. The method according to claim 6, wherein the particulate filter is oriented vertically with the unclean part down.

8. The method according to claim 2, wherein the vibration motor is a pneumatic vibration motor.

9. The method according to claim 3, wherein the at least two vibration motors are pneumatic vibration motors.

10. The method according to claim 4, wherein the vibration motors are vibrating at a vibration frequency of 350 Hz.

11. The method according to claim 5, wherein during the second stage the air flow is a pressurized air flow at 1.5 bar.

12. The method according claim 6, wherein the particulate filter is a car DPF or a car GFP.

* * * * *